United States Patent [19]

Jones

[11] Patent Number: 4,586,236
[45] Date of Patent: May 6, 1986

[54] METHOD AND APPARATUS FOR FORMING STACKS OF LAMINATED METALLIC MEMBERS

[75] Inventor: Carl E. Jones, Cabot, Pa.

[73] Assignee: Penn United Technology, Inc., Cabot, Pa.

[21] Appl. No.: 571,564

[22] Filed: Jan. 17, 1984

[51] Int. Cl.$^4$ .............................................. H02K 15/02
[52] U.S. Cl. ................................. 29/564.6; 29/564.7; 29/738
[58] Field of Search ............... 29/34 R, 609, 738, 732, 29/564.6, 564.2, 564.7; 414/114, 120

[56] References Cited

U.S. PATENT DOCUMENTS

| | | | |
|---|---|---|---|
| 4,110,895 | 9/1978 | Mitsui | 29/609 X |
| 4,264,663 | 4/1981 | Beenken | 29/609 X |
| 4,311,424 | 1/1982 | Schwab et al. | 414/114 X |

*Primary Examiner*—Howard N. Goldberg
*Assistant Examiner*—Timothy V. Eley
*Attorney, Agent, or Firm*—Parmelee, Miller, Welsh & Kratz

[57] ABSTRACT

A method and apparatus for automatically forming stacks of mechanically interlocked laminated members comprises a punch and die assembly for forming one or more stacks of laminates of the same or different shapes and means associated with one of the laminate dies for measuring stack height to a predetermined dimension. When the desired stack height is reached, the measuring means, which is preferably an optical sensor, transmits a signal to responsive means which, in turn, activates an air cylinder and a slide cam carried by the punch assembly to recycle the operation by commencing the formation of a next stack of laminated members. Improved mechanical interlocking and stacking density is obtained by coining the areas of the mechanical interlocks prior to formation of bow tie shaped interlocks within the punch and die assembly.

11 Claims, 14 Drawing Figures

METHOD AND APPARATUS FOR FORMING STACKS OF LAMINATED METALLIC MEMBERS

BACKGROUND OF THE INVENTION

The present invention relates generally to laminated stacks of flat metallic members for use in electrical devices and, more particularly, to a method and apparatus for automatically producing laminated stacks of uniform height, and of improved, mechanically interlocked strength.

DESCRIPTION OF THE PRIOR ART

There are numerous types of electrical devices such as motors, transformers, ballasts and the like which utilize wound cores of stacked metallic laminations so as to produce the particular electro-magnetic properties desired. Normally, the dimensional tolerance of the overall stack of laminates forming a core is relatively small, while the tolerance for the thickness of each individual laminate is not as critical. As a result, less expensive, higher tolerance sheet or strip stock may be employed to form the laminates. It can be readily appreciated that when high tolerance strip stock is employed in the manufacture of low tolerance core stacks, some degree of care must be exercised so as to achieve the specified stack height. Heretofore, it has been common practice to separately stamp individual laminates in a conventional punch and die, collect the loose laminates, and then stack them in a holder, mandrel or similar fixture to the desired stack height. The discrete stacks so formed are then fastened by welding, riviting or the like, and readied for core winding and assembly into the particular electrical device intended. Needless to say, this prior method of laminated stack manufacture has proved to be relatively slow and costly.

Various methods and apparatus have heretofore proposed in an attempt to decrease the costs associated with laminated stack manufacturing, such as in the use of mechanically interlocking laminations. Exemplary of such are U.S. Pat. Nos. 4,110,895; 4,272,579; 4,149,309; and 4,380,775 to Mitsui, which disclose stacks of laminates held together by specially shaped projections formed in the individual laminates, wherein each projection mechanically grips an aperture formed in a subjacent laminate. The bottom laminate depicted in these Mitsui patents has the projection blanked out by a cam operated punch so as to provide a flat stack bottom. The apparatus depicted in the aforementioned U.S. Pat. No. 4,110,895 requires such a flat stack bottom because the stacks are separately supported on a flat surface during manufacture which later functions as a means for applying a compressive force to press fit the interlocks in each completed stack.

In addition, various means have been proposed to obtain a constant stack height, such as that shown in U.S. Pat. No. 4,264,663 to Beenken, wherein a laminated stack, having prepressed and specially shaped mechanical interlocks, is formed by feeding stamped strips to a feed roller, the feed roller having projections spaced apart a distance equal to the height of the desired stack.

A further device for obtaining a premeasured stack height is described in U.S. Pat. No. 4,079,512 to Lakes, which utilizes a plurality of coplanar pick-off fingers to remove stacks of unattached laminations from a vertical supporting mandrel for later welding or like fastening. A similar, horizontally arranged pick-off device is described in U.S. Pat. No. 4,311,424 to Schwab et al., which also handles noninterlocked laminations. While the above referred to prior art has attempted to solve various individual problems associated with the manufacture of stacked laminations, all possess some deficiencies, either in the quality of the stack produced, the complex nature of the device, or its low production rate.

SUMMARY OF THE INVENTION

My invention solves many of the problems heretofore encountered in the prior art by providing a method and apparatus for automatically producing stacks of interlocked metallic laminates of predetermined height in a high speed and economic manner. The method and apparatus of my invention produces premeasured laminated stacks of close tolerance wherein one or more stacks of laminates, of the same or of a different shape, are stamped and stacked simultaneously in a single punch and die assembly. My invention further provides for the production of mechanically interlocked, premeasured stacks, exhibiting little laminate warpage in the area of the interlocks so as to improve the stacking density and strength of the article produced.

Briefly, my invention includes a multi-station punch and die assembly adapted for use in an automatic cycling press of the type well-known in the metal stamping industry. The punch and die assembly contains a plurality of punches and dies for sequentially forming, in thin metal strip stock, first coined areas, then partially pierced mechanical interlocks within the coined areas, and finally, one or more shaped laminates blanked from the strip and stacked within and beneath the cavity of each of the blanking dies. The punches forming the mechanical interlocks, or a separate set of punches, are selectively activated to blank out the interlocks on the laminates to form the lowermost or base laminate of a new stack. In one presently preferred embodiment of the invention, a corner of one of the said base laminates is blanked out by a triangular punch to define a notched, reference laminate. An optical sensing device is positioned adjacent the die containing the reference laminate, with its light path traversing the corner of the die cavity in which the notched corner of the reference laminate is situated. The optical sensing device is adjustably mounted in spaced relation beneath the upper surface of the laminate die and fixed at the desired stack height dimension relative thereto. The unnotched laminates within the optical sensing die will block the beam of light and the stamping and stacking of interlocked laminates will continue in normal fashion until the notched, reference laminate descends into the light beam path. This notch instantaneously causes the light beam to be transmitted, by way of a fiber optic cable, to an amplifier base which, in turn, sends a delayed signal to a solenoid device and air cylinder means to activate the punches for the blanking out of the mechanical interlock and the corner notching of the next reference laminate of a new stack. This newly formed base reference laminate, as well as the other base laminates formed at the time, are then blanked from the strip on top of the stacks then residing in the dies. The laminate blanking punches carry punch inserts conforming to the shape of the interlocks and, during the blanking operation, these punches press the interlocks into tight engagement with the interlocks in the subjacent laminate. The base laminates do not mechanically interlock with their respective subjacent laminates in the dies because of their blanked out interlocks and, thus, a separation between the adjacent stacks is achieved. Lateral pressure pads mounted within the die assembly compressively support edge portions of the descending stacks beneath the open ended dies and deliver the formed stacks to a bin, stacking shoot or like receiving means.

Preferably, associated with the optical sensing means is a magnetic proximity switch which senses the vertical movement of the punch assembly and thus functions as a means for counting the number of individual laminates being formed in a stack. In one presently preferred mode of operation, the proximity switch functions as a fail/safe device so as to override the optical sensing device in the event of a malfunction due to corner punch breakage or the like. The proximity switch is electrically connected to two counters, one of which is pre-set at a minimum expected number of laminations and the other pre-set at the expected maximum number. Thus, during normal operations, the optical sensing means will, in cyclical fashion, signal the formation of new stacks within the plus or minimum expected range. However, if for some reason the optical sensing means detects a notched reference laminate at a counting sequence below the expected minimum or if no optical signal is sensed at the expected maximum, circuit means connected to the counters of the proximity switch, will, if desired, sound an alarm and/or concurrently shut down the press. In this manner, unwanted scrap generation or further tool damage is kept to a minimum.

For those instances where the tolerance on stack height is relatively large or where the strip thickness tolerance is very small, it is possible to employ the proximity switch alone as a counting means, to determine stack height. In such an operation, when the desired number of lamination forming strokes sensed by the proximity switch is reached, a signal is sent from a counter/amplifier to the punch control means to blank out the interlocks, as previously described and the formation of a new stack is begun.

My present invention also contemplates an improved mechanical interlock configuration in which the strip or sheet stock is first thinned by coining prior to the formation of the interlock itself. The interlock generally resembles a bow tie in appearance and comprises a pair of partially pierced locking wings downwardly bent from the laminate sheet with outwardly flared edges which engage tapered openings formed in a subjacent laminate. The pre-thinned wings provide a flat, gapless overlay between adjacent laminates which greatly improves the overall quality and strength of the interlocked stacks.

BRIEF DESCRIPTION OF THE DRAWINGS

The above as well as other features and advantages of the invention will become apparent through consideration of the following detailed description in connection with the accompanying drawings, in which.

DETAILED DESCRIPTION OF THE INVENTION

Figure 1:
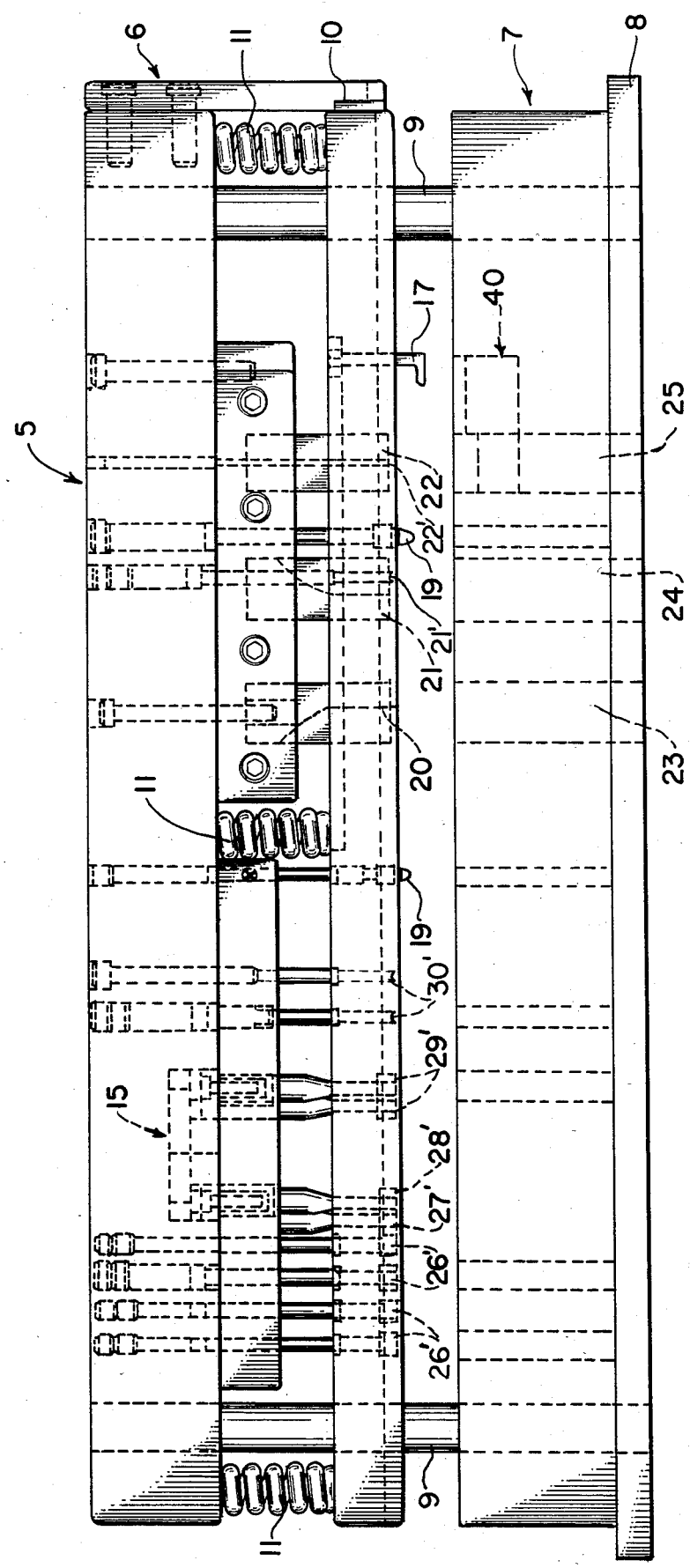
FIG. 1 is a front elevation view of the punch and die assembly of the present invention.
Figure 3:
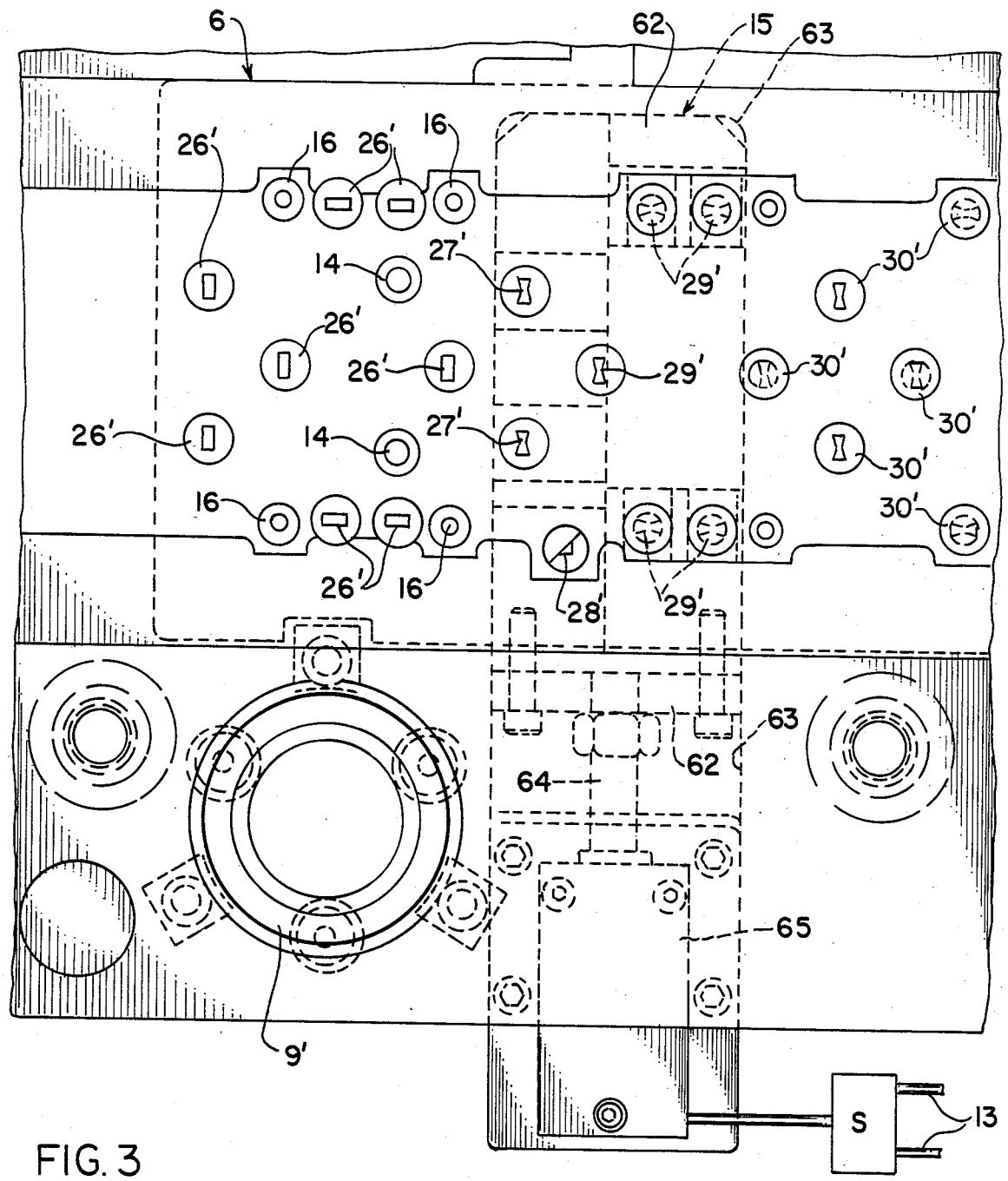
FIG. 3 is a fragmentary plan view of a portion of the punch assembly showing the pneumatically actuated slide cam and associated punches.

Referring now to FIG. 1 of the drawings, a punch and die assembly, generally designated 5, is shown and comprises an upper punch assembly 6, a lower die 7 and a base platen 8. The punch assembly 6 carries a plurality of punches some of which are shown in FIGS. 1 and 3 as 20, 21, 22, 26', 27', 28', 29' and 30', for forming a strip of thin gauge metal into stacks of laminations. The punch and die assembly 5 contains conventional guide rods 9 with bushings 9' and a pressure or stripper plate 10, downwardly biased by springs 11, for firmly engaging the metal strip against the top surface of the die assembly 7 during the stamping operation. Alignment pins 19 carried by punch assembly 5 aid in centering the metal strip within the tooling in conventional fashion. In order to gain a better appreciation of the function of the various tooling discussed herein, attention is invited to FIG. 9 which depicts the metal strip stock, generally designated 70, as it is progressively formed within the tool and die assembly 5, showing the transition from a solid metal strip to the final blanked form.

Figure 9:
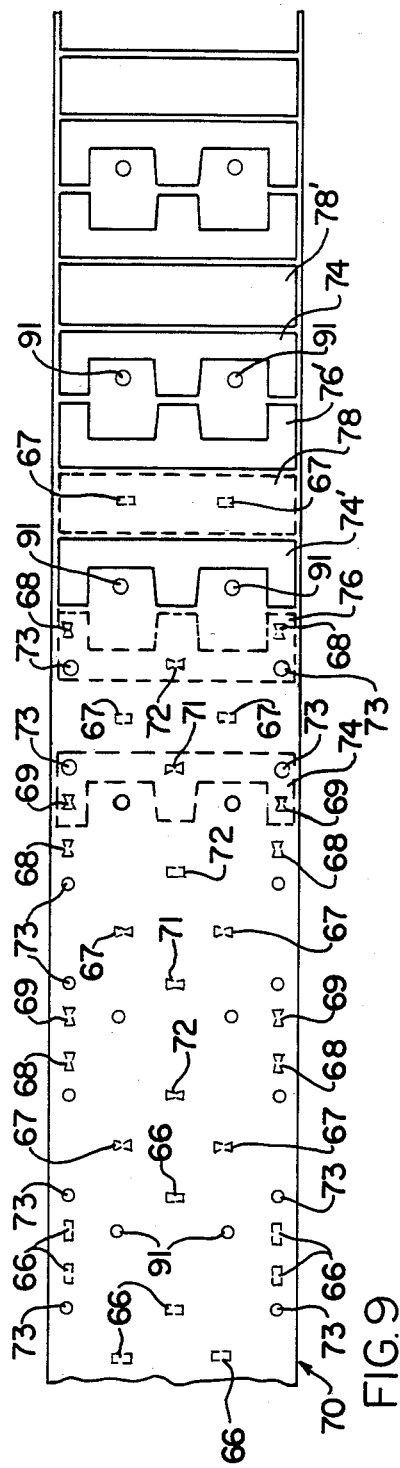
FIG. 9 is a plan view of a piece of metal strip stock as it may appear as it is progressively formed in the punch and die assembly of FIG. 1.

As will be explained in greater detail hereinafter, individual laminates are blanked from the metal strip by punches 20, 21 and 22 and are stacked to a predetermined height and mechanically interlocked within the die cavities 23, 24 and 25, respectively, and exit the punch and die assembly 5 from the bottom thereof. The particular punch and die assembly 5 depicted in the drawings is a so-called "EE-I" punch and die, which produces mechanically interlocked stacks of laminates for later use in an electrical device. Referring to the full and partial plan views of the die and punch assemblies depicted in FIGS. 2 and 3, respectively, and to the strip 70 of FIG. 9, it can be understood how the laminates are formed and stacked. The tooling comprises a first set of eight rectangularly faced coining punches 26' which strike and compress the metal strip stock forming coined areas 66 therein. The die contains hardened cylindrical inserts 26 which are aligned with the coining punches 26' and have their surfaces flush with the top of the die in order to backup and absorb the striking force of the aforesaid coining punches 26'. In order to progressively advance the metal strip 70 from station to station along the length of the punch and die assembly 5, alignment holes 91 are formed therein by punches 14 which are then aligned within the assembly by pins 19 carried by the punch assembly 6. As metal strip 70 progressively advances, the coined areas 66 are partially pierced and formed by punches 27' and 29' or by punches 30' to form mechanical interlocks 67, 68 and 69. Thence, blanking punches 20, 21 and 22 blank out a first "E" laminate 74, a second "E" laminate 76 and an "I" laminate 78. As metal strip 70 progresses through the die after the blanking of the aforesaid laminations, their blanked out portions 76', 74' and 78' appear as shown in FIG. 9. In order to insure a tight and strong mechanical bond between the interlocks of adjacent laminates, the blanking punches 20, 21 and 22 carry outwardly protruding punch inserts, such as 21' and 22' in FIG. 1, which conform to the shape and location of the interlocks previously formed in the strip. These seating punches 21' and 22' press the interlocks in the laminate being blanked into tight engagement with interlocks in the subjacent laminate.

Figure 13:
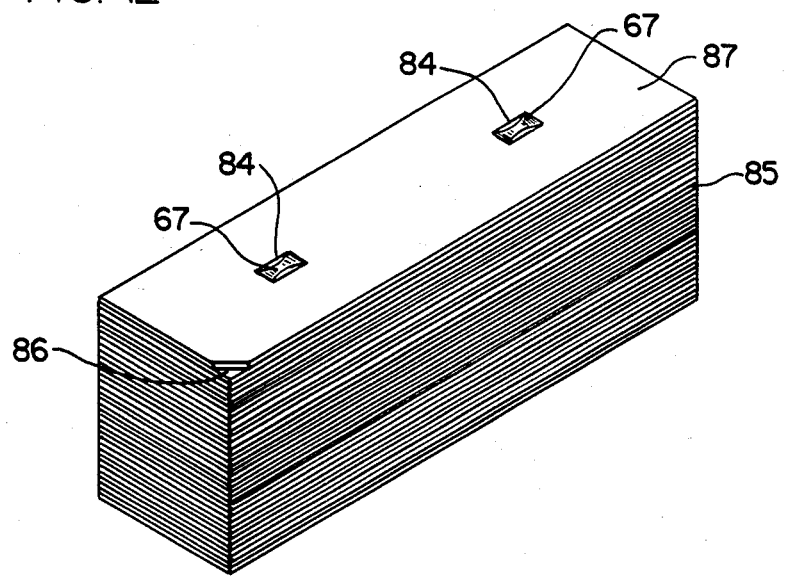
FIG. 13 is a perspective view of an inverted stack of mechanically interlocked "I" laminates formed in accordance with the present invention.
Figure 14:
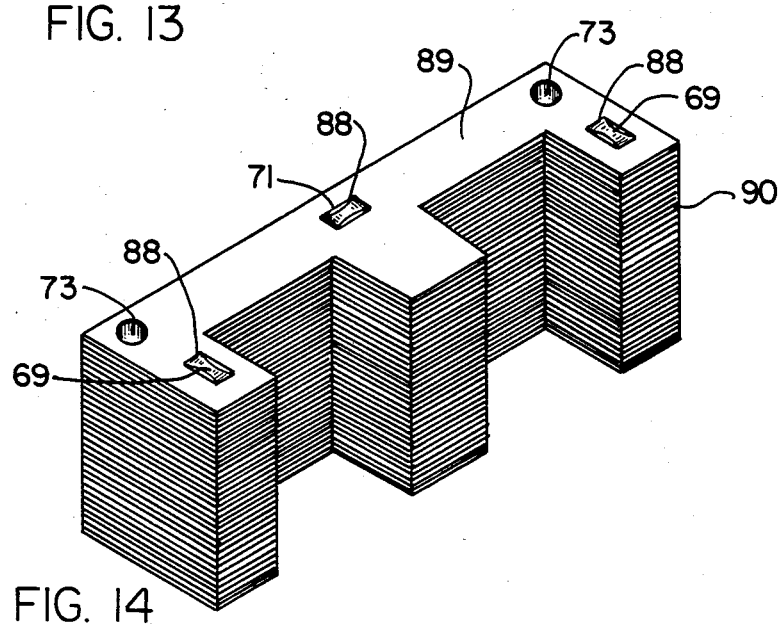
FIG. 14 is a perspective view of a stack of mechanically interlocked laminates, of an "E" configuration, formed in accordance with the present invention.

Hence, in the normal stamping operation, individual laminates are blanked from the strip and stacked within their respective die cavities in mechanically interlocked relationship to form stacks, such as stacks 85 and 90 shown in FIGS. 13 and 14, respectively. While the presently preferred embodiment depicted in the drawings discloses "I" and "E" shaped laminations, it can be appreciated that the die can be machined to any other desired shape of lamination. Likewise, various holes can be formed in the lamination, such as the holes 73 shown in the "E" lamination of FIGS. 9 and 14. In the preferred embodiment shown, holes 73 are formed by punches 16, FIG. 3.

Figure 10:
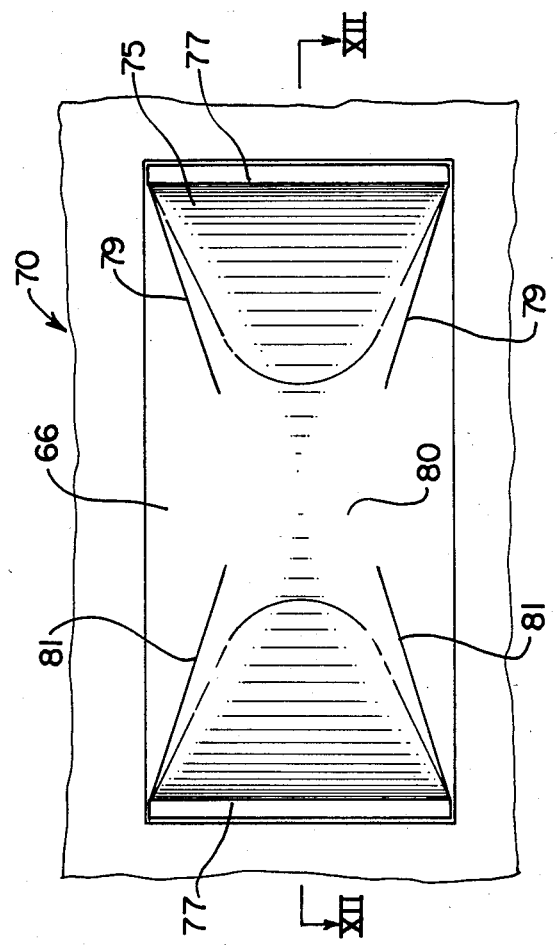
FIG. 10 is an enlarged, plan view of a mechanical interlock of the present invention.
Figure 12:
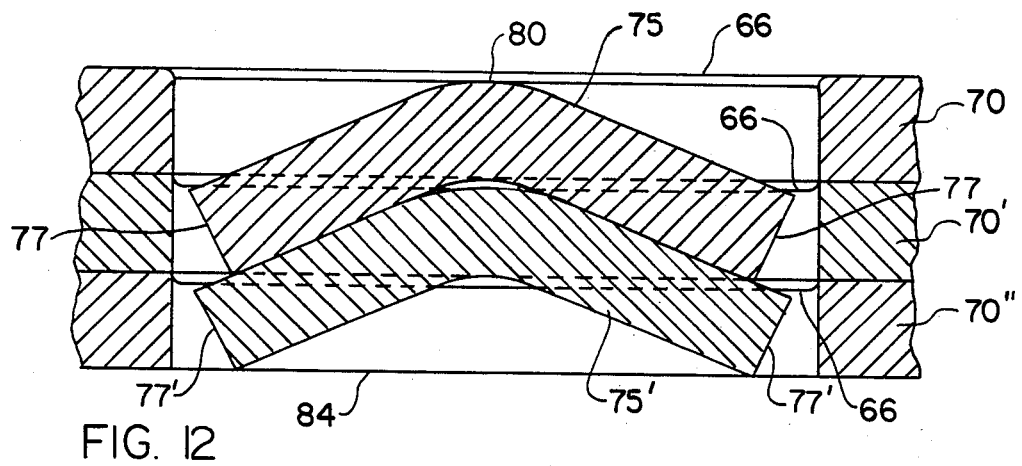
FIG. 12 is a cross-sectional view of two coined mechanical interlocks of the present invention taken along line XII—XII of FIG. 10.

The mechanical interlocks 67, 68, 69, 71 and 72, formed in strip 70, are all identical in shape and resemble a bow tie in plan view. Such a representative interlock 75 is depicted in the enlarged view of FIGS. 10 and 12. Mechanical interlock 75 is partially pierced from the strip 70 by punches 27', 29' or 30' within coined or thinned area 66 of the metal strip stock previously formed by the coining punches 26'. The interlock punches 27', and 29' and 30' have concave shaped faces which form and bend the wider or flared ends 77 downwardly while partially cutting the interlock 75 to define tapered sides 79 and 81 which converge to form a narrowed, unpierced central portion 80 therebetween. In some laminate configurations, it may not be possible to fit a full bow tie interlock into a given area and, in such applications, only one-half of the bow tie is formed, for example, only side 79 is pierced and formed. The downwardly bent and outwardly tapered sides 79 and 81 of the full bow tie interlock 75 grippingly engage the pierced and tapered sides of a subjacent laminate interlock. The flared ends or edges 77 of each interlock are downwardly bent a distance equal to the thickness of the metal strip stock 70, such that the end 77 of each of the interlocks extend to the lower surface of a subjacent laminate. In this manner, and as can be seen in FIG. 12, base laminate sheet 70" exhibits a flat, planar surface since the edges 77' of superjacent interlock 75' do not extend beyond its lower surface.

In order to cause a separation between two adjacent stacks of laminations being formed within and below the punch and die assembly 5, the bow tie interlock is blanked out completely in the base laminate sheets 70", forming an open, bow tie shaped area 84 therein. Thus, it can be appreciated that no mechanical interlock will be made between the base laminate formed from sheet 70" and a subjacent laminate (not shown), due to the absence of an interlocking bow tie in the open area 84. In the completed stacks of laminates depicted in FIGS. 13 and 14, which, for the purpose of clarity, are shown as inverted from the orientation they would assume during stamping, the "I" stack 85 has a base or reference laminate 87 with two blanked out interlock areas 84 formed therethrough. Two bow tie mechanical interlocks 67 carried by the laminate adjacent to laminate 87 grippingly engage the areas 84. Likewise, the completed "E" stack of laminations 90 (also inverted) of FIG. 14 has a base laminate 89 with three blanked out interlock areas 88 which are engaged by the bow tie interlocks 69 and 71 carried by the laminate adjacent thereto.

Figure 11:
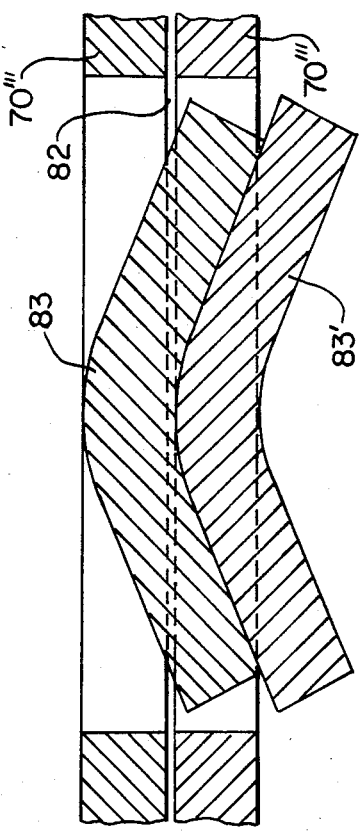
FIG. 11 is a cross-sectional view of two uncoined mechanical interlocks.

In order to improve the stacking tightness or density of laminates having bow tie mechanical interlocks, I have found that it is also necessary to first coin the areas of the interlocks prior to forming the bow tie as indicated at 66 in the drawings. The problem of stacking uncoined interlock laminates is shown in the greatly enlarged view of FIG. 11. It can be seen when interlocks 83 and 83' are formed from an uncoined strip 70''', a gap 82 is present between the laminates. This gap results from the fact that the true vertical dimension of the stacked, angularly disposed interlocks 83 and 83' is greater than the stacked thickness of two horizontally disposed laminates. Thus, it is desirable to first form coined areas 66 in order to obtain tight stacking of the type depicted in FIG. 12. The coined areas 66 compensate for the added angular dimension of the bow tie interlocks 75 and 75' so as to eliminate gaps between adjacent laminate sheets 70 and 70' and between sheets 70' and 70". In the presently described embodiment, utilizing 0.025 inch thick metal strip stock, I have determined that a coining depth of about 0.001 inches, or about 4% of the stock thickness, is sufficient to provide a tight stack of laminations.

Figure 2:
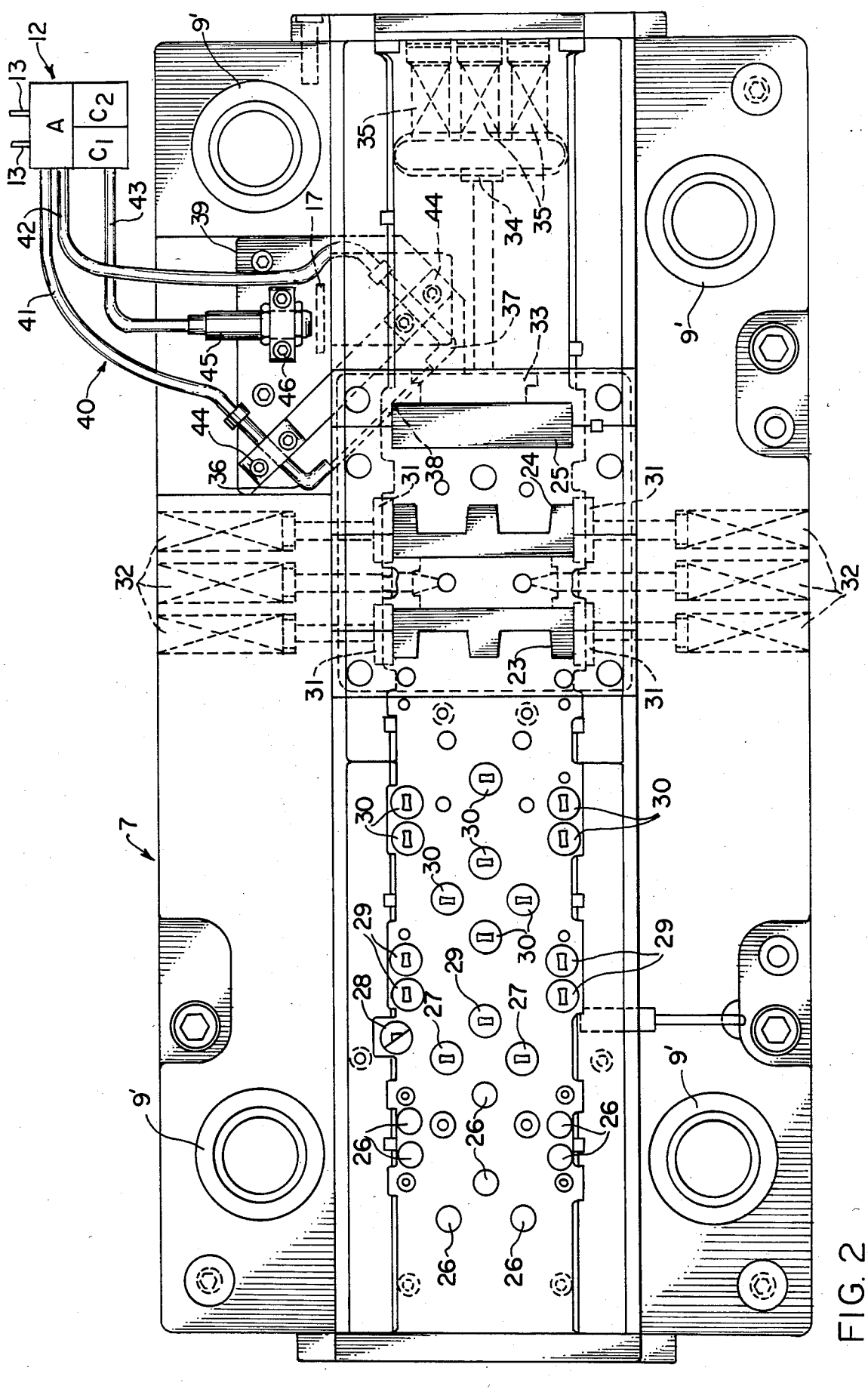
FIG. 2 is a plan view of the die assembly showing the optical sensing means and proximity switch in place thereon.

The base laminate for each new stack being formed in the punch and die assembly 5 have all of their mechanical interlocks blanked out by the punches 27' and 29' which are periodically activated by slide cam means, generally designated 15 in FIG. 3. Also, the "I" laminate 87 has one corner 86 blanked out by punch 28'. As will be explained in greater detail, this base laminate or reference laminate 87 triggers the optical sensing means to establish the height of the finished stack. The strip stock 70 advances within the punch and die assembly to a point where the "E" laminates and the "I" laminates are blanked from the strip 70 within die cavities 23, 24 and 25, respectively. After the mechanical interlocks and corner notch 86 have been blanked from the base laminates, a slide cam mechanism 15 deactivates to permit the normal formation of mechanical interlocks in the strip stock 70 and, likewise, corner punch 28' retracts within the punch assembly 6. The metal strip stock continues to advance and the press continues to blank and stack individual laminates within the die cavities 23, 24 and 25. With reference to FIG. 2, pressure pads 31 compressively engage opposed edges of the "E" stacks, by way of heavy duty springs 32, below the top surface of the die assembly 7 so as to hold the stacks in place beneath the blanking die cavity until a separation occurs between the stacks. Likewise, a pressure pad 33 compressively supports side edges of the "I" stacks. Pad 33 is held in place by a support member 34, which is backed by heavy duty springs 35. It can be appreciated that the support afforded by pressure pads 31 and 33 provides for a high production rate since the completed stacks continuously descend from the die cavities to the pressure pads and exit from beneath as separate, mechanically interlocked stacks.

With each stroke of the press, three individual laminates are blanked from strip 70 and the individual mechanical interlocks 67, 69, 71 and 72, are compressed downwardly by seating punches, such as 21' and 22', to engage a subjacent laminate within each of the die cavities 23, 24 and 25 to form a mechanical interlock therebetween. As successive laminations are blanked and stacked within the die cavities, the stacks continue to descent beneath said cavities until the notched portion 86 of the reference laminate 87 shown in FIG. 13 reaches an optical target area 38 located in a corner of the die cavity 25, FIG. 4. At this point, a light beam which is normally blocked by the unnotched laminates within die cavity 25, is permitted to pass through a slot 50 to activate control means which, in turn, causes movement of the slide cam means 15, causing the activation of piercing punches 27', 29' and notching punch 28' to form the blanked out interlocks on a new group of base laminates and the notched reference laminate of the next stacks of laminates.

Figure 4:
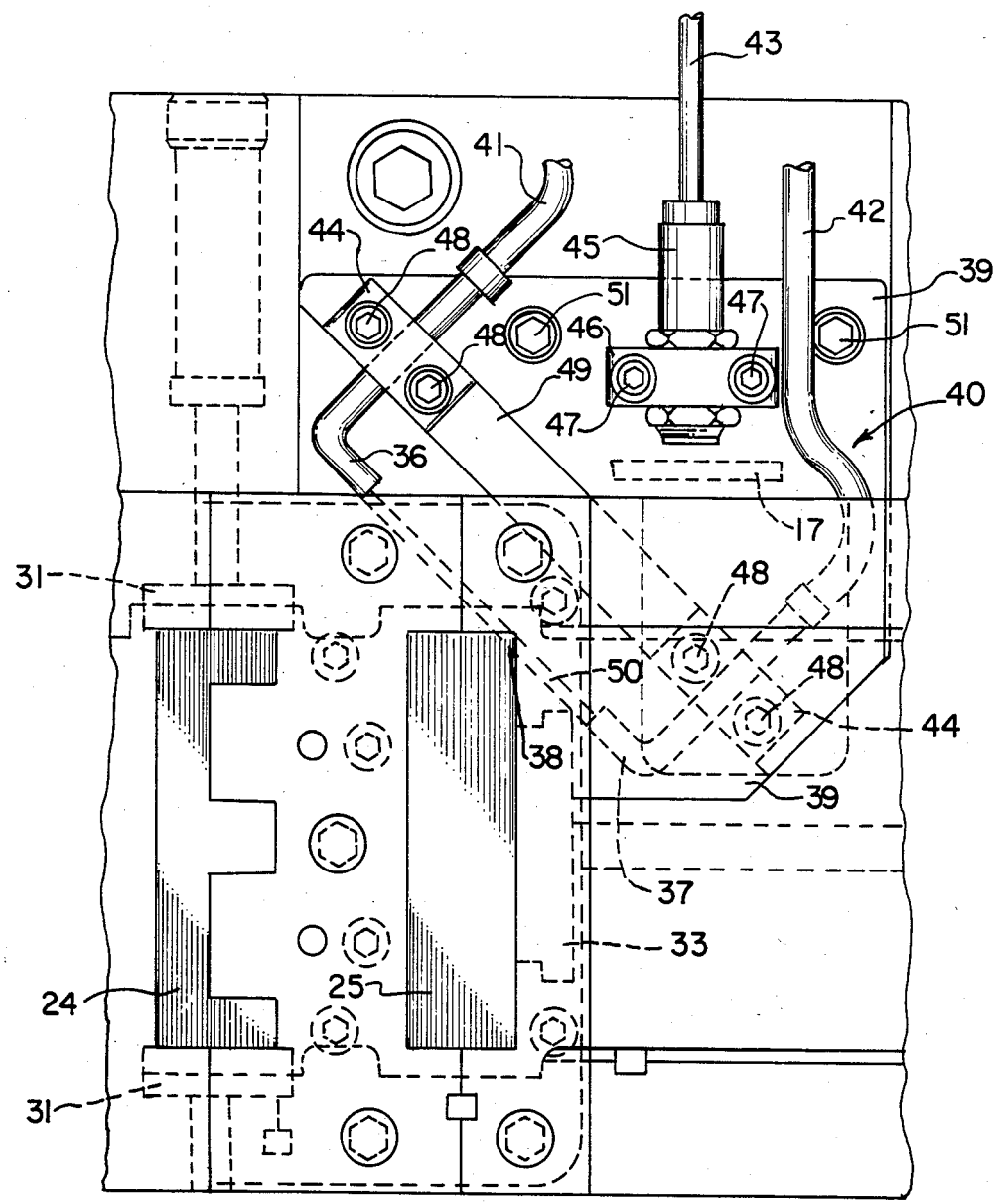
FIG. 4 is an enlarged, partial plan view of the die assembly, optical sensing means and proximity switch of FIG. 2.

The optical sensing means, generally designated 40, shown in FIGS. 2 and 4, includes a pair of fiber optic cables 41 and 42 for transmitting and receiving a beam of light, respectively. Fiber optic alignment members 36 and 37 are attached to the cables 41 and 42 respectively, and are positioned adjacent to the slot 50 such that the light beam transmitted and received thereby tranverses the target area 38 beneath the upper surface of the "I" die cavity 25. With reference to FIGS. 4 through 8, the mounting details of the optical sensing means 40 will be explained in greater detail. Optical alignment members 36 and 37 are held in place by clamps 44 which are secured within an alignment channel 49 by bolts 48. The light slot 50 is formed within an insert 55 which is fitted within the die assembly 7, beneath the die cavity 25. Insert 55 is fitted beneath the top surface of the die 25, such that the slot 50 is spaced a distance below the top surface approximately equal to the dimension of the laminates stack height. As can be seen in FIG. 6, the insert 55 has an opening 56 formed therein to permit the insertion of pressure pad 33. A spacer plate 60 is secured to the die plate assembly and a support plate 39 rests thereon. The support place 39 contains machined surfaces 53 with which abut machined surfaces 54 of the die insert 55 such that the alignment groove 49 of the support plate 39 is accurately positioned relative to the light slot 50. The clamps 44 comprise a removable bottom portion 44' and a central passage 57 for receiving the optical alignment members 36 and 37 therethrough. The clamps 44 are secured within the alignment groove 49 by way of bolts 48 which are received within holes 58 of the clamps and threadably secured within holes 59 of the support plate 39.

Figure 5:
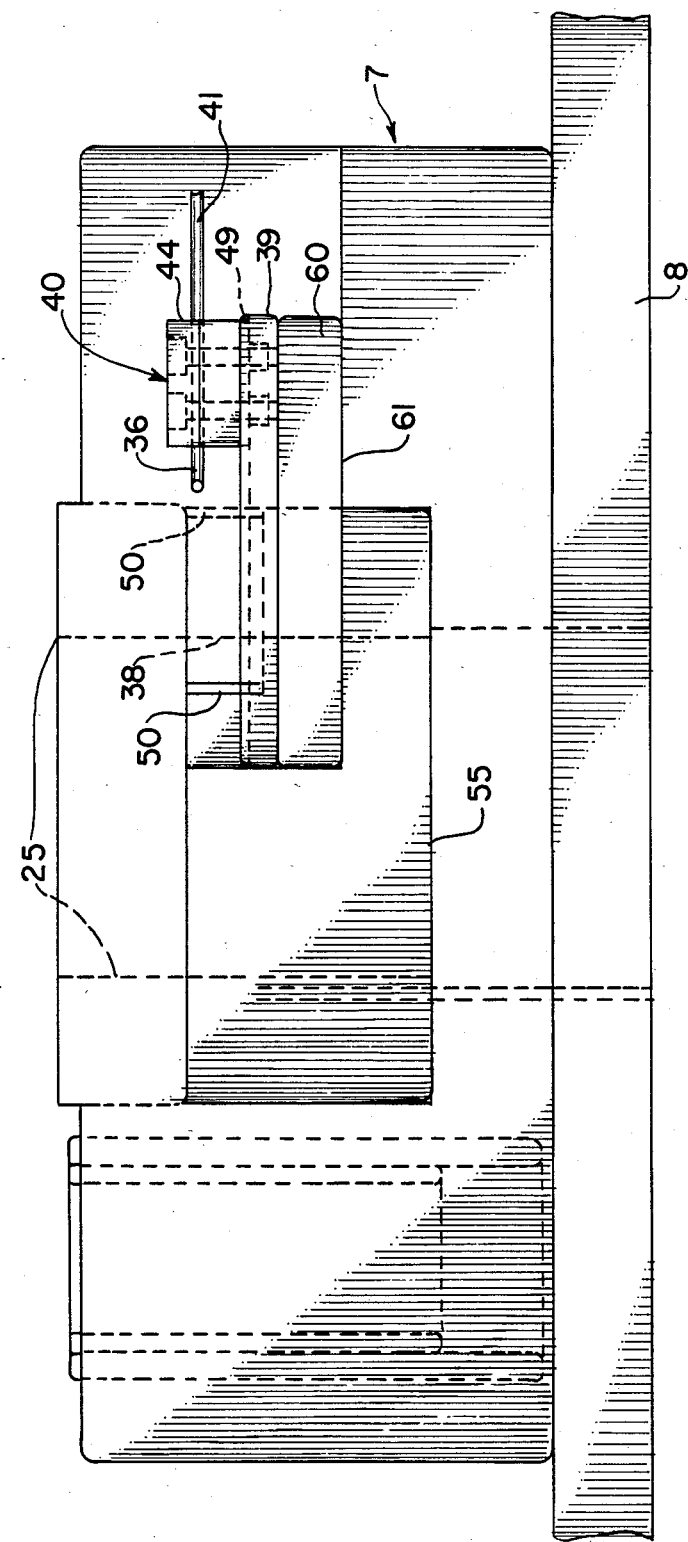
FIG. 5 is a side elevation view of a portion of the die assembly of FIG. 4.
Figure 6:
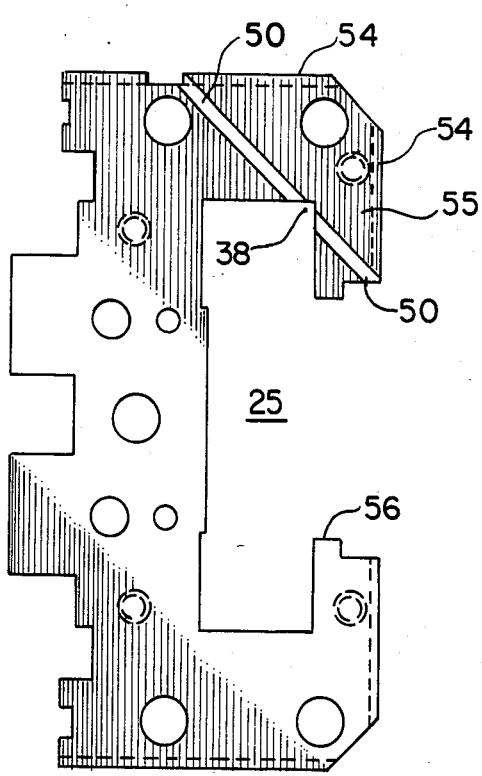
FIG. 6 is a plan view of a die insert used in connection with the optical sensing means of the present invention.
Figure 7:
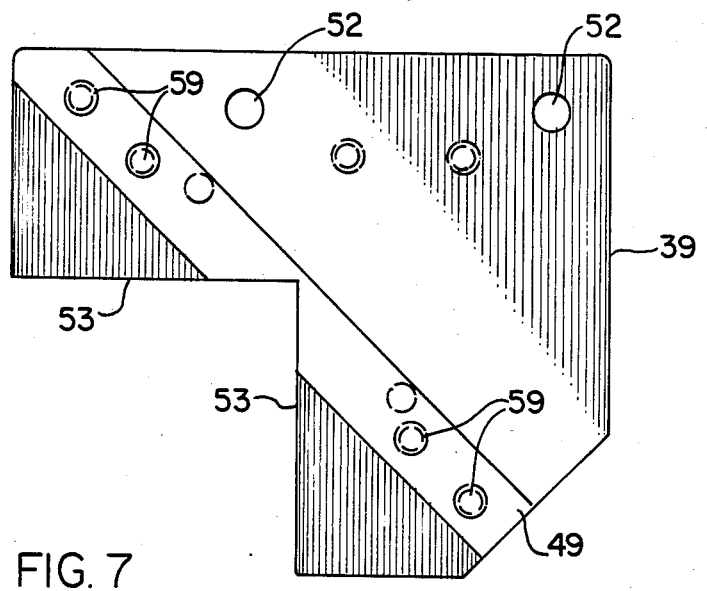
FIG. 7 is a plan view of a mounting block for the optical sensing means.
Figure 8:
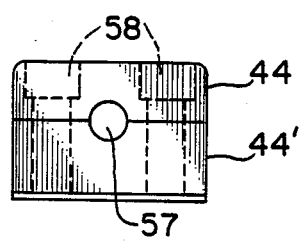
FIG. 8 is a front elevation of a clamping block for a fiber optic cable.

FIG. 5 is a partial side view of the optical sensing means 40 in place on the die assembly 7. For the purpose of clarity, several of the elements present in FIG. 4 are not shown in FIG. 5, such as fiber optic members 37, 44 and proximity switch 45. In this manner, the alignment and mounting arrangement of the optical sensing means 40 relative to the die assembly 7 may be better explained. The height of a stack of laminations is predetermined by the vertical spacing between the plane defined by the top horizontal surface of the die cavity 25 and the beam of light emitted by the fiber optic member 36. As can be seen in FIG. 5, the emitted light beam from member 36 will pass through the slot 50 within the die insert 55 intersecting the desired target area 38 in its path. Slot 50 is vertically elongated so as to permit vertical adjustment of the members 36 and 37 relative to the top of die cavity 25 in order to permit the manufacture of stacks of laminations of various heights falling within the vertical dimension of the slot 50. Adjustments in the spacing between member 36 and the top of die cavity 25, in order to effect final stack height, are preferably made by interchanging the spacer plate 60 with one of a different machined thickness. Thus, the stack height is easily established by preselecting a spacer plate 60 of a given incremental thickness in order to provide the desired spacing between the member 36 and the top surface of die cavity 25. While not shown in plan view, the spacer plate 60 matches the shape of the support plate 39 shown in FIG. 7 including the right angle seating edges 53 thereof. Both the support plate 39 and the spacer plate 60 are secured, by way of bolts 51 passing through holes 52, to the die assembly 7 on a flat seating surface 61, FIGS. 5 and 7.

Referring again to FIG. 2, during the stamping operation, the unnotched laminates within die cavity 25 will normally block the beam of light being transmitted through fiber optic cable 41 and member 36 to the target area 38. The stamping and stacking of interlocked laminates within dies 23, 24, and 25, will continue in normal fashion until the notched referenced laminate, such as laminate reference 87 of FIG. 13, carrying notched corner 86, descends into the path of the light beam at target area 38. At this point, the beam of light instantaneously traverses the open corner at 38 and strikes fiber optic receiver member 37 and is transmitted by way of fiber optic cable 42 to a control means generally designated 12. The light beam transmitted by cable 42 is sensed by an amplifier base "A" which is pre-programmed by a delay card in conventional fashion to send a delayed signal by way of electrical wiring 13 to a solenoid device designated "S" in FIG. 3, associated with the slide cam mechanism 15 of the punch assembly 6. Upon receipt of an amplified and delayed signal from amplifier base "A", solenoid "S" activates an air valve (not shown) causing pneumatic cylinder 65 to move the slide cam 62 within a passageway 63 formed within the punch assembly 6. Slide cam 62 is attached to pneumatic cylinder 65 by shaft 64 and mounting plate 62 and carries a plurality of bevelled surfaces which are positioned above the punches 27', 28' and 29'. When solenoid "S" activates pneumatic cylinder 65, the slide cam 65 moves within passage 63 to a position where its bevelled surfaces cause the punches 27' and 29' to downwardly extend to blank out the mechanical interlocks in strip 70 and cause the formation of a notched corner through the downward action of punch 28', thus forming the base laminates for the next three stacks. After the corner notch and the blanked out interlocks are formed, the slide cam 62 retracts to its normal operating position to permit the normal formation of the mechanical interlocks by punches 27', 28' or 30' while the corner notching punch 28' remains in a retracted position. The strip 70 containing the blanked out interlocks and notched portion advances within the punch and die assembly 5 to the laminate blanking station whereupon each laminate is blanked within its respective die cavities 23, 24 and 25. As previously stated, due to the fact that the mechanical interlocks have been blanked out from each laminate, there is a separation between such laminates and the subjacent laminates in each die cavity. The stamping operation continues until the notched base reference laminate previously formed descends within die cavity 25 into target area 38 and the cycle is repeated.

Preferably associated with the optical sensing means 40 is a magnetic proximity switch 45 which is secured to support plate 39 by a bracket and bolts 46. A steel or iron bar 17 attached to the punch assembly 6 moves in the vicinity of the proximity switch 46 senses each stroke of the punch assembly in order to count the number of individual laminates being formed in a stack. In one preferred mode of operation, proximity switch 45 functions as a fail/safe device so as to override the optical sensing means 40 in the event of a tooling malfunction or the like. The proximity switch 45 is electrically connected by way of conduit 43 to two counters "C1" and "C2". Counter C1 may be preset at a minimum expected number of laminations and counter C2 may be set at the expected maximum number. For example, in a stack comprising nominally 55 individual laminates of 0.025 inches in thickness, counter C1 may be set at a minimum of 50 while counter C2 may be set at a maximum of 60. During normal operations, the optical sensing means 40 will, in cyclical fashion, transmit an activation signal to the solenoid "S" and the slide cam means 15 for the formation of new stacks within the expected 50 to 60 laminate range. With each new cycle the counters C1 and C2 automatically are reset to a zero count. However, if for some reason the optical sensing means 40 detects a notched reference laminate at a counting sequence below 50 or if no optical signal is sensed prior to a 60 count, an override circuit means 40 (not shown), comprising conventional switching means, relays and the like, connected to the counters C1 and C2 of the proximity switch 45, will generate an alert signal, and, if desired, sound an alarm and/or concurrently shut down the press by disconnecting the clutch and applying a brake to the flywheel of the press in conventional fashion. Thus, in the event of tool breakage or other malfunction, the fail/safe means will minimize unwanted scrap generation.

It is also possible to use the proximity switch 45 and counter C1 alone to determine stack heights in those cases where the height tolerance is relatively great or in those instances where the strip thickness tolerance is very small. In this mode of operation, when the desired number of lamination forming strokes sensed by proximity switch 45 is reached, a signal is sent from the counter C1 to the amplifier base A to the punch control means 15 to blank out the interlocks, as previously described, and the formation of new stacks is begun. At the inception of each new cycle, counter C1 is automatically reset to a zero count.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given full breadth of the appended claims and any and all equivalents thereof.

I claim:

1. An apparatus for forming stacks of laminated metallic members in an automatic cycling press from a strip of metallic material, said apparatus, comprising:

a punch and die assembly, adapted for mounting within the press, including a plurality of first punches for forming coined areas in the metallic strip stock and a plurality of second punches for piercing and forming mechanical interlocks within the coined areas on said strip stock, said assembly including at least one laminate blanking punch and a mating, open-ended die cavity for blanking and stacking interlocked laminates within the die cavity, said die cavity including means for compressively supporting edge portions of the descending stacks of laminations beneath the die cavity; means associated with the punch assembly for activating a selected number of said second punches whereby the areas of the mechanical interlocks in one laminate are blanked out upon receipt of an activation signal to form a base laminate of a next stack of laminates, whereby said base laminate, when blanked and stacked within the die cavity, rests against an uppermost lamination of a subjacent stack; and measuring means associated with the punch and die assembly for sensing the height of the stack of metallic members being stacked within the die cavity, whereupon, when a predetermined stack height is reached, said measuring means transmits an activation signal to the punch activation means, whereby the activated second punches form a base laminate of a next stack of laminations, said blanked out mechanical interlock areas providing a generally flat exterior surface on each base laminate whereby a separation between each stack of laminations and a subjacent stack occurs beneath the blanking die cavity.

2. The apparatus of claim 1 wherein the punch assembly includes a notching punch for activation by the punch activation means and for blanking out a corner from the base laminate to form a base reference laminate, and said measuring means comprises means for optically sensing the notched corner of the base reference laminate within the die cavity, whereby an activation signal is sent to the punch activation means when said notched corner is detected by said optical sensing means.

3. The apparatus of claim 2 wherein the optical sensing means comprises fiber optic means for transmitting and receiving a beam of light traversing a corner of the die cavity to define a target area in the path of the notched corner of the base reference laminate, said target area spaced a predetermined distance beneath the top of the die cavity to establish the height of a stack of interlocked laminations, said measuring means further includes amplifier base means associated with the fiber optic means for receiving an optical signal when the notched corner of the base reference laminate is detected and for transmitting an activation signal to the punch activation means.

4. The apparatus of claim 3 wherein the punch activation means comprises a slide cam member, movably positioned within a passage way formed in the punch assembly and having bevelled surface areas which engage top portions of the selected second punches for blanking out the mechanical interlocks and the notching punch when said slide cam member is in a first activated position and which disengage said selected punches and said notching punch when said slide cam member moves to a second deactivated position and including activation means for moving said slide cam member to the first position and then to the second position upon receipt of the activation signal from the amplifier base of the optical sensing means.

5. The apparatus of claim 4, wherein the activation means associated with the slide cam member includes a solenoid device electrically connected to the amplifier base for receiving an activation signal therefrom, a pneumatic cylinder and piston device connected to the slide cam member and air valve means associated with said solenoid and said pneumatic device for selectively supplying pressurized air to said pneumatic device for moving the slide cam between said first and second positions.

6. The apparatus of claim 2 including a proximity switch for sensing each stroke of the punch assembly and counting means associated with the proximity switch for counting the number of lamination blanking strokes forming a stack within a preset numerical range, circuit means associated with said counting means and said optical sensing means for emitting an alert signal in the event said optical sensing means fails to send an activation signal within the numerical range of laminations preset in the counting means.

7. The apparatus of claim 2 wherein the punch and die assembly includes a plurality of laminate blanking punches and mating die cavities for blanking and stacking a plurality of separable stacks of interlocked laminations, wherein the optical sensing means is associated with one of said die cavities.

8. The apparatus of claim 7 comprising three sets of laminate blanking punches and mating die cavities, configured respectively, to produce two "E"-shaped laminations and one "I"-shaped lamination with each cycle of the press and wherein the optical sensing means is associated with the "I"-shaped die cavity.

9. The apparatus of claim 1, wherein the measuring means comprises counting means for counting the number of blanking strokes of the punch assembly to a predetermined number of blanked laminates forming a completed stack, whereby an activation signal is sent to the slide cam means when the predetermined number is counted by said counting means.

10. The apparatus of claim 1, wherein the punches for piercing and forming the mechanical interlocks each have a concave face and are configured to form a bow tie shaped interlock in the strip stock having opposed flared, downwardly projecting end portions and inwardly tapered side edges partially pierced from the strip, extending inwardly from the end portions to an unpierced central portion therebetween.

11. The apparatus of claim 1, wherein the laminate blanking punch also includes a plurality of seating punches conforming to the shape and location of the mechanical interlocks carried by the strip stock, to compressively engage the interlocks in a laminate while it is being blanked whereby tight engagement with the interlocks in a subjacent laminate is achieved.

* * * * *